United States Patent
Ogawa

(10) Patent No.: US 11,908,217 B2
(45) Date of Patent: Feb. 20, 2024

(54) DOCUMENT READING DEVICE FOR GENERATING A CROPPED IMAGE AND METHOD FOR CONTROLLING THE SAME

(71) Applicant: SHARP KABUSHIKI KAISHA, Sakai (JP)

(72) Inventor: Kazuma Ogawa, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

(21) Appl. No.: 17/890,486

(22) Filed: Aug. 18, 2022

(65) Prior Publication Data

US 2023/0069064 A1 Mar. 2, 2023

(30) Foreign Application Priority Data

Aug. 30, 2021 (JP) .................................. 2021-139652

(51) Int. Cl.
| | | |
|---|---|---|
| *H04N 1/04* | (2006.01) | |
| *G06V 30/41* | (2022.01) | |
| *G06V 30/146* | (2022.01) | |
| *G06T 7/11* | (2017.01) | |
| *H04N 1/12* | (2006.01) | |

(52) U.S. Cl.
CPC ................ *G06V 30/41* (2022.01); *G06T 7/11* (2017.01); *G06V 30/147* (2022.01); *H04N 1/122* (2013.01); *G06T 2207/20132* (2013.01)

(58) Field of Classification Search
None
See application file for complete search history.

(56) References Cited

U.S. PATENT DOCUMENTS

| | | | | |
|---|---|---|---|---|
| 2017/0094088 A1* | 3/2017 | Murata | ............... | H04N 1/00588 |
| 2020/0336615 A1* | 10/2020 | Ono | ..................... | G06V 10/243 |
| 2021/0127025 A1* | 4/2021 | Horiguchi | .......... | H04N 1/00737 |
| 2021/0306519 A1* | 9/2021 | Masuda | ............ | H04N 1/00331 |
| 2021/0385352 A1* | 12/2021 | Sadowara | .......... | H04N 1/00331 |
| 2022/0109768 A1* | 4/2022 | Katoh | ................ | H04N 1/00785 |
| 2022/0337717 A1* | 10/2022 | Fujisaki | ............. | H04N 1/00816 |
| 2022/0345583 A1* | 10/2022 | Ogawa | ................. | H04N 1/3935 |
| 2022/0385778 A1* | 12/2022 | Fukutome | .......... | H04N 1/00785 |

FOREIGN PATENT DOCUMENTS

JP 2017201767 A 11/2017

* cited by examiner

*Primary Examiner* — Dung D Tran
(74) *Attorney, Agent, or Firm* — ScienBiziP, P.C.

(57) ABSTRACT

A document reading device includes a document conveyer, a first reader reading, in a first reading position, a first surface of a conveyed document such that a read area is larger than the conveyed document, a second reader reading, in a second reading position, a surface (second surface) opposite to the first surface such that a read area is larger than the conveyed document, a region detector executing a process of detecting a first document region that is a region of a document in first document image data and a process of detecting a second document region that is a region of the document in second document image data, and a cropping processor cropping a document portion on the first surface as first cropped image data and cropping a document portion on the second surface as second cropped image data, based on one of the document regions successfully detected.

10 Claims, 9 Drawing Sheets

DOCUMENT READING DEVICE FOR GENERATING A CROPPED IMAGE AND METHOD FOR CONTROLLING THE SAME

BACKGROUND OF THE INVENTION

Field of the Invention

The present disclosure relates to a document reading device and a method for controlling the document reading device.

Description of the Background Art

Reading devices having a document cropping function have been generally used. The document cropping function detects and crops a document portion in image data obtained by scanning. Only the document portion is automatically cropped from the image data. The image reading devices disclosed in the related arts have an image reader that scans a document held by a document holder of a document cover mounted on a contact glass to generate a scanned image, a document detector that searches for and detects a document image in the scanned image, an image processor that crops the document image detected by the document detector, and a display that displays a warning screen to the user, and a controller. When the document detector fails to detect a document image, the controller displays a first warning screen on the display urging a user to reposition the document on the contact glass, and causes, after the reposition of the document, the image reader to perform the scanning again. Furthermore, the first warning screen includes a position specifying message to specify an arrangement position for repositioning the document that is where the document touches one of four corners of the contact glass or one of four sides of the contact glass.

In a document cropping process, document edges in the image data may be detected in order to detect the document portion in the image data obtained by the scanning. By performing cropping along the detected edges, only the document portion can be accurately cropped out. However, depending on a color of the document, the edges of the document are not represented in the image data. As a result, some of or all the edges of the document may not be detected and the detection of the document portion may fail. For example, when a color of a background (an opposing plate) of the document and a ground color (a paper color) of the document are the same or similar, the edges of the document may not be detected. In this case, the document portion may not be accurately cropped.

One aspect of the present disclosure is to detect, in image data of a front surface and image data of a back surface of a document, respective document regions, and to reliably and accurately crops the document regions based on a plurality of detection results.

SUMMARY OF THE INVENTION

According to an aspect of the present disclosure, a document reading device includes a document conveyer that conveys a document along a document conveying path, a first reader that reads, in a first reading position in the document conveying path, a first surface of the conveyed document such that a read area is larger than the conveyed document, a second reader that reads, in a second reading position in the document conveying path, a second surface that is opposite to the first surface such that a read area is larger than the conveyed document, a region detector that executes a process of detecting a first document region that is a region of a document in the first document image data obtained by the reading on the first surface and a process of detecting a second document region that is a region of the document in the second document image data obtained by the reading on the second surface, and a cropping processor that crops a document portion on the first surface from the first document image data as first cropped image data and crops a document portion on the second surface from the second document image data as second cropped image data, based on one of the first and second document regions that is successfully detected.

According to another aspect of the present disclosure, a method for controlling a document reading device includes conveying a document along a document conveying path, reading, in a first reading position in the document conveying path, a first surface of the conveyed document such that a read area is larger than the conveyed document, reading, in a second reading position in the document conveying path, a second surface that is opposite to the first surface such that a read area is larger than the conveyed document, detecting a first document region that is a region of a document in the first document image data obtained by the reading on the first surface, detecting a second document region that is a region of the document in the second document image data obtained by the reading on the second surface, and cropping a document portion on the first surface from the first document image data as first cropped image data and cropping a document portion on the second surface from the second document image data as second cropped image data, based on one of the first and second document regions that is successfully detected.

According to an aspect of the present disclosure, the effect is to reliably and accurately crop document portions from respective image data obtained by reading front and back surfaces of a document.

DESCRIPTION OF THE PREFERRED EMBODIMENTS

Figure 1:
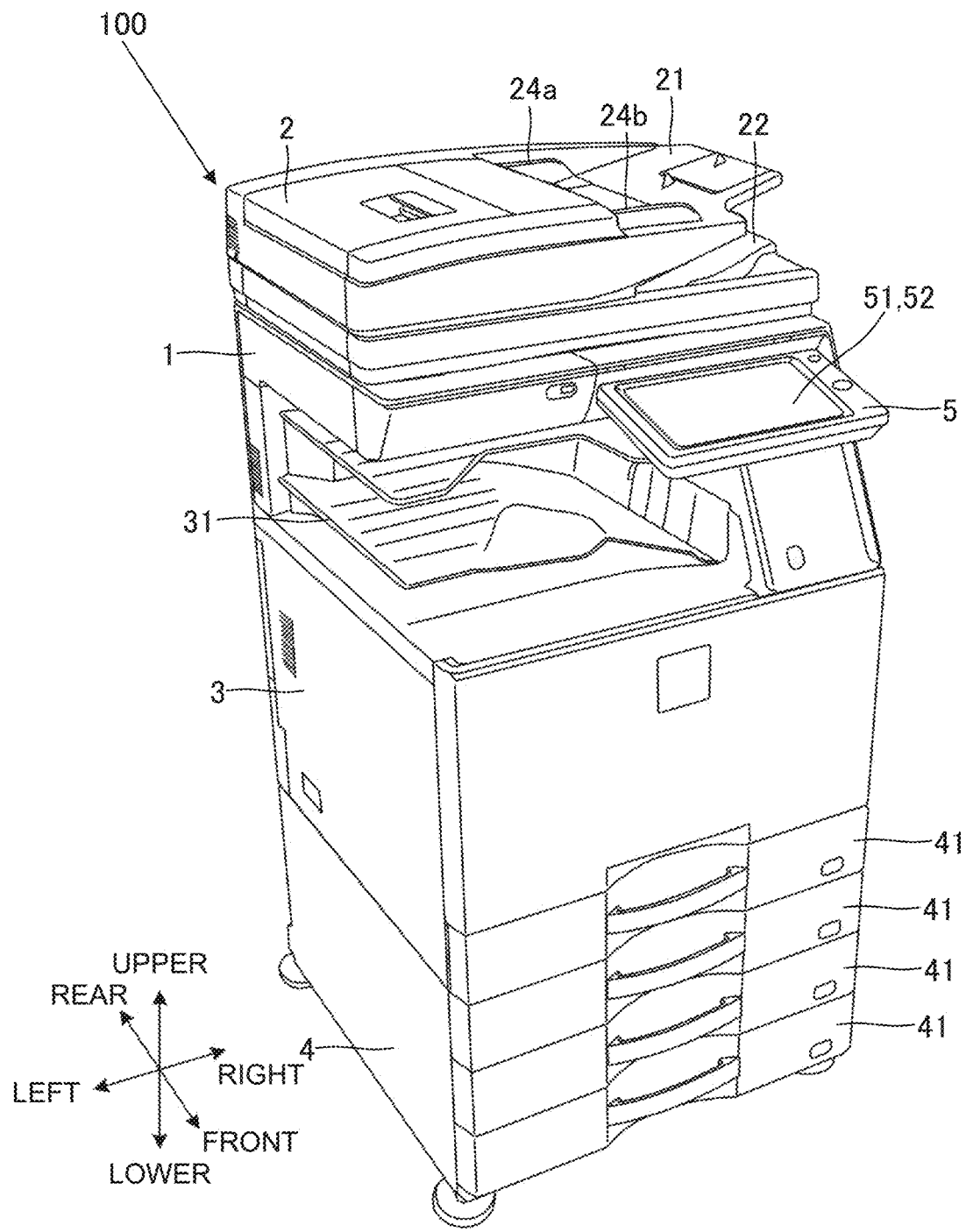
FIG. 1 is a diagram illustrating an example of a multi-function peripheral according to an embodiment.

A document reading device and a method for controlling the document reading device according to the present disclosure will be described hereinafter with reference to the accompanying drawings. In the drawings, identical or equivalent elements are marked with the same symbols. A multifunction peripheral 100 (MFP) is taken as an example of the document reading device according to an aspect of the disclosure.

In the following description, a main scanning direction is parallel to reading lines of a document 200 and perpendicular to a conveyance direction of the document 200. A sub-scanning direction is parallel to the conveyance direction of the document 200. The sub-scanning direction is perpendicular to the main scanning direction.

Multifunction Peripheral 100

Figure 2:
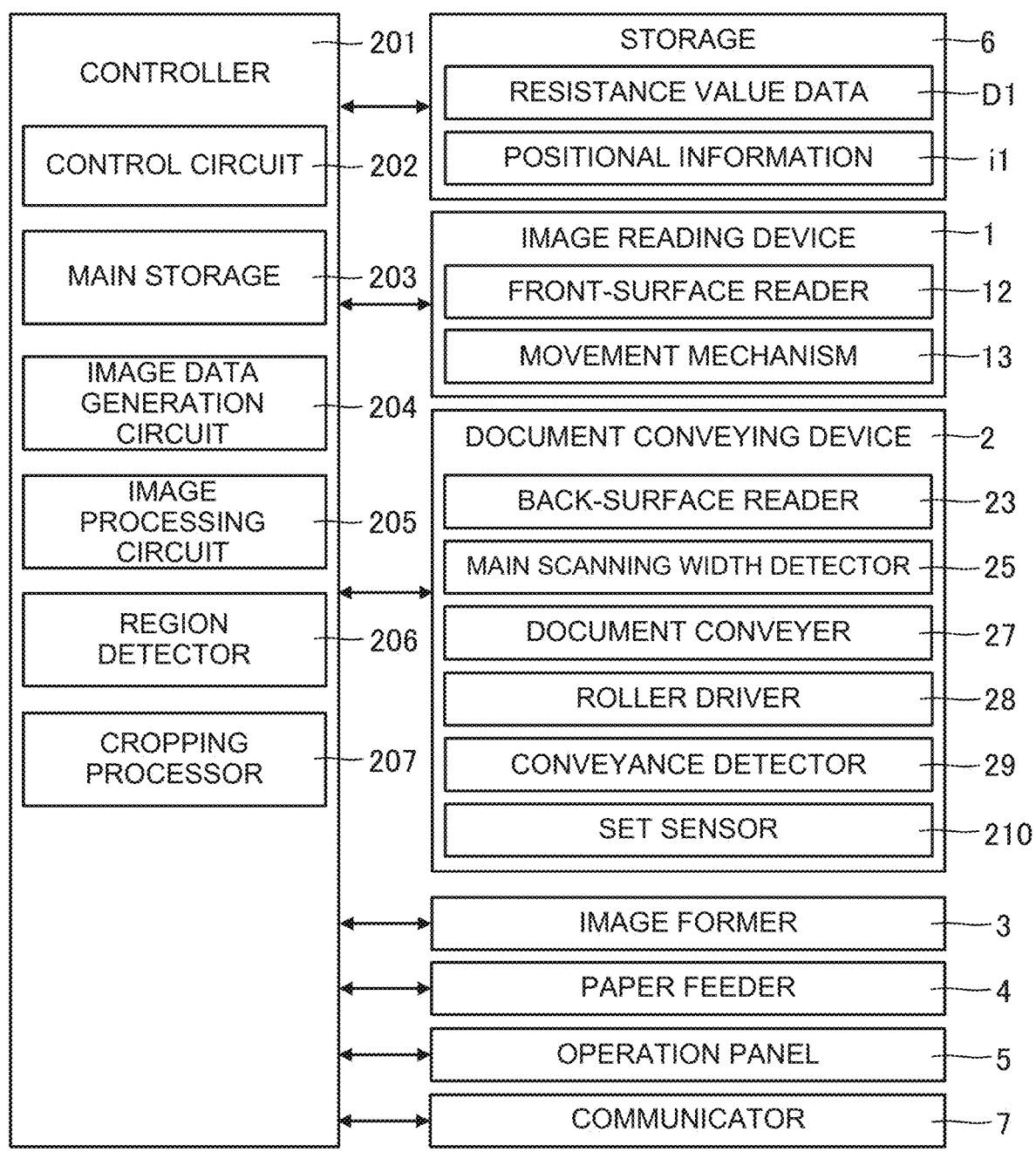
FIG. 2 is a block diagram illustrating an example of the multifunction peripheral according to the embodiment.

An embodiment of a multifunction peripheral 100 will be described with reference to FIGS. 1 and 2. FIGS. 1 and 2 are diagrams illustrating an example of the multifunction peripheral 100 according to the embodiment.

FIG. 1 shows an example of appearance of the multifunction peripheral 100. The multifunction peripheral 100 is also a type of image-forming apparatus. The multifunction peripheral 100 has a plurality of functions. The multifunction peripheral 100 has, for example, a copying function, a scan-to-transmission function, a scan-to-storage function, a printer function, and a facsimile function. In FIG. 1, a vertical direction corresponds to a vertical direction of the multifunction peripheral 100, a diagonally downward right corresponds to a front of the multifunction peripheral 100, a diagonally upward left corresponds to a rear of the multifunction peripheral 100, a diagonally downward left corresponds to a left side of the multifunction peripheral 100, and a diagonally upward right corresponds to a right side of the multifunction peripheral 100.

An image reading device 1 is installed at a top of the multifunction peripheral 100. Furthermore, a document conveying device 2 is installed on a top of the image reading device 1. The image reading device 1 reads a surface (one side) of a document 200. The image reading device 1 includes a document table 11 and a front-surface reader 12 (refer to FIG. 4). The document table 11 is disposed at an upper surface of the image reading device 1 (see FIG. 3). The front-surface reader 12 reads a front surface of the document 200 placed on the document table 11.

The document conveying device 2 can be opened and closed. When the document conveying device 2 is opened, an upper surface of the document table 11 is exposed. The document 200 may be placed on the document table 11. When closed, the document conveying device 2 covers the upper surface of the document table 11. The closed document conveying device 2 holds the document 200 placed on the document table 11. In other words, the document conveying device 2 functions as a document holding cover. In FIG. 1, an example of the document conveying device 2 in a closed state is illustrated.

The document conveying device 2 includes a document tray 21 and a document discharge tray 22. A plurality of documents 200 (a bundle of documents) may be set on the document tray 21. The document conveying device 2 incorporates a back-surface reader 23 (refer to FIG. 4). The back-surface reader 23 reads a back surface (the other side) of the document 200 being conveyed. A plurality of documents 200 of a sheet shape may be set on the document tray 21. The document conveying device 2 automatically feeds the documents 200 placed on the document tray 21, one at a time, to a reading position of the front-surface reader 12. Note that the document conveying device 2 conveys the document 200 in the closed state. The image reading device 1 can read the document 200 that is being conveyed by the document conveying device 2. The read document 200 is discharged to the document discharge tray 22. The back-surface reader 23 reads a back surface of the document 200 before the document 200 is discharged to the document discharge tray 22.

Furthermore, an image former 3 is disposed below the image reading device 1. The image former 3 prints an image based on image data on an image recording medium of a sheet shape. Examples of the image recording medium include paper. Image data subjected to image processing performed by an image processing circuit 205 is used for printing. This image former 3 may perform an image-forming process of an electrophotographic method (a Carlson process method). Therefore, the image former 3 may include a photoreceptor drum, a charging device, an exposure device, a developing device, a transferring device, a fixing device, a cleaning device, and a static elimination device. Furthermore, the image former 3 may perform printing using ink. Printed matters of the image former 3 are discharged to a paper discharge tray 31. Note that the paper discharge tray 31 is located in a space in a body provided in a lower portion of the image reading device 1. Alternatively, the paper discharge tray 31 may be provided in a space outside the body of the multifunction peripheral 100.

Then, a paper feeder 4 is provided below the image former 3 (the multifunction peripheral 100). The paper feeder 4 includes one or more paper feeding cassettes 41. Each of the paper feeding cassettes 41 accommodates image recording media. The different paper feeding cassettes 41 may accommodate sheets of different sizes. At a time of printing, one of the paper feeding cassettes 41 feeds sheets. The sheets are fed, one at a time, to the image former 3.

An operation panel 5 is disposed at a front of the multifunction peripheral 100 and the image reading device 1. The operation panel 5 has an upward-facing operation surface as illustrated in FIG. 1. On this operation surface, a display 52 with a touch panel 51 is disposed. For example, the display 52 is a liquid crystal display (LCD). The touch panel 51 accepts a touch operation performed by the user. Settings related to jobs can be configured. For example, the touch panel 51 is a projected capacitive panel.

As shown in FIG. 2, the multifunction peripheral 100 has a controller 201, the image reading device 1, the document conveying device 2, the image former 3, the paper feeder 4, the operation panel 5, a storage 6, and a communicator 7. These are connected to one another in a communication available manner. Note that the image reading device 1, the document conveying device 2, the image former 3, the paper feeder 4, and the operation panel 5 are as described above.

The controller 201 controls the multifunction peripheral 100. The controller 201 includes a control circuit 202 (a processor) and a main storage 203. For example, the control circuit 202 is a CPU (Central Processing Unit). Furthermore, examples of the main storage 203 include a ROM (Read Only Memory) and a RAM (Random Access Memory). The main storage 203 stores control programs and firmware to be used by the control circuit 202 to perform control and calculation.

Furthermore, the controller 201 includes an image data generation circuit 204. The image data generation circuit 204 may process image signals that are obtained when the front-surface reader 12 reads the document 200 and that are thereafter output from the front-surface reader 12 so as to generate image data of the document 200. The front-surface reader 12 will be described below in detail. Furthermore, the image data generation circuit 204 processes image signals that are obtained when the back-surface reader 23 reads the document 200 and that are thereafter output from the back-surface reader 23 of the document conveying device 2 so as to generate image data of the document 200. The back-surface reader 23 will be described below in detail. In the following description, image data obtained by reading performed on the document 200 is referred to as document image data.

The controller 201 includes an image processing circuit 205. The image processing circuit 205 performs image processing on image data. The image processing circuit 205 may perform image processing on document image data, for example. Image data subjected to image processing performed by the image processing circuit 205 may be supplied to the image former 3 for printing. Alternatively, the image data subjected to the image processing may be stored (saved) in the storage 6. Furthermore, the image data subjected to the image processing may be transmitted to an outside via the communicator 7.

As shown in FIG. 2, for example, the controller 201 includes a region detector 206 and a cropping processor 207. The region detector 206 and the cropping processor 207 are functionally realized when the control circuit 202 (a processor) or the image processing circuit 205 executes programs and software stored in the storage 6. Note that the controller 201 may include a circuit (hardware) that performs processes of the region detector 206 and the cropping processor 207.

The storage 6 includes at least one of a hard disk drive and a flash memory. The storage 6 stores various data, such as image data subjected to the image processing, in a non-volatile manner.

The communicator 7 includes, for example, a communication circuit, a communication memory, and a communication port. The communicator 7 is connected to a communication network, not illustrated, to perform bidirectional communication with a counterpart via the communication network. Examples of the counterpart include a computer. The computer is a PC or a server, for example.

Figure 3:
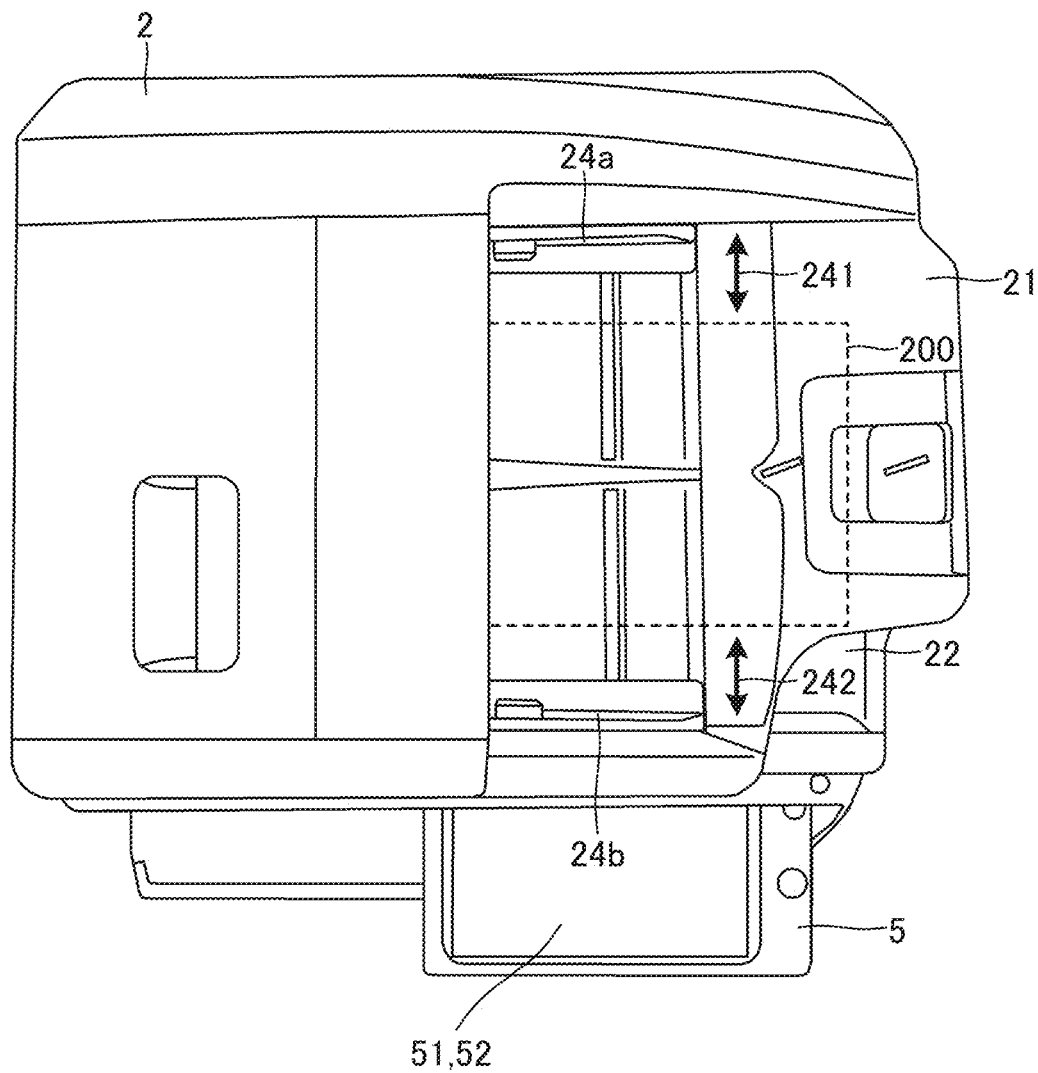
FIG. 3 is a diagram illustrating an example of a document conveying device according to the embodiment.
Figure 4:
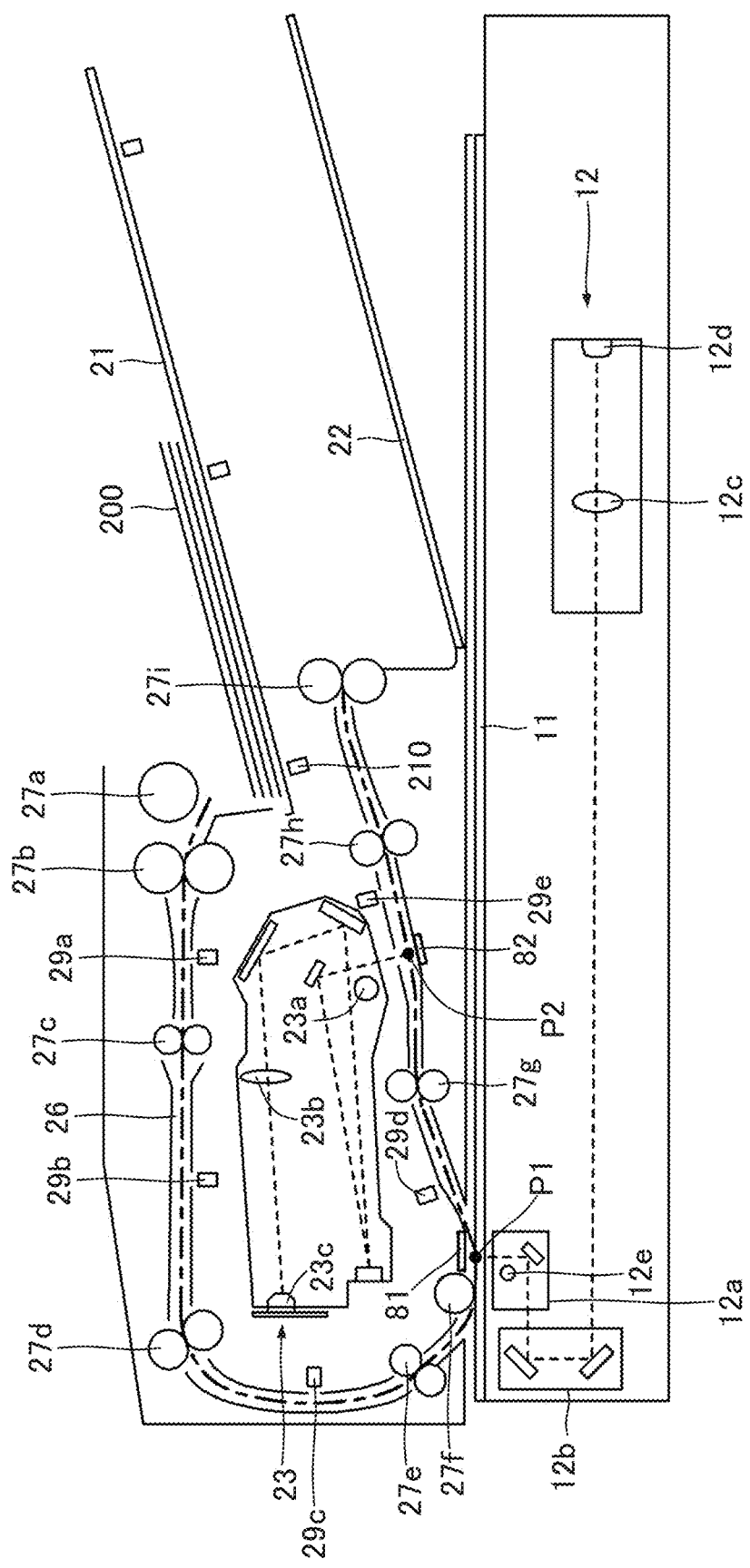
FIG. 4 is a diagram illustrating examples of an image reading device and the document conveying device according to the embodiment.

Image Reading Device 1 and Document Conveying Device 2 Next, a mode of the image reading device 1 and the document conveying device 2 will be described with reference to FIGS. 3 and 4. FIG. 3 is a diagram illustrating an example of the document conveying device 2 according to the embodiment. FIG. 4 is a diagram illustrating examples of the image reading device 1 and the document conveying device 2 according to the embodiment. In FIG. 3, an example of the document conveying device 2 viewed from above is illustrated. In FIG. 4, the image reading device 1 and the document conveying device 2 are viewed from the front of the multifunction peripheral 100.

As shown in FIG. 3, the document conveying device 2 has a first document guide 24a and a second document guide 24b. The first document guide 24a and the second document guide 24b are a pair. The first document guide 24a and the second document guide 24b have respective contact surfaces parallel to the sub-scanning direction (a conveyance direction) of the document 200. The contact surfaces and opposite edges of the document 200 extending in the sub-scanning direction are in contact with each other. In other words, the first document guide 24a and the second document guide 24b sandwich the document 200 in the main scanning direction. By this, a position of the document 200 is regulated.

Specifically, the first document guide 24a and the second document guide 24b can be manually slid in the main scanning direction. A first arrow 241 in FIG. 3 indicates an example of a movement direction of the first document guide 24a. A second arrow 242 in FIG. 3 indicates an example of a movement direction of the second document guide 24b. The first document guide 24a and the second document guide 24b symmetrically operate at the same time. When the first document guide 24a is moved closer to a center between the first document guide 24a and the second document guide 24b, the second document guide 24b is also moved closer to the center by the same distance. When the first document guide 24a is moved away from the center, the second document guide 24b is also moved away from the center by the same distance. A center of the set document 200 coincides with a center of an interval between the first document guide 24a and the second document guide 24b in the main scanning direction. A dashed line in FIG. 3 indicates an example of the document 200.

The document conveying device 2 includes a main scanning width detector 25 (refer to FIG. 2). The main scanning width detector 25 detects at least a position of the first document guide 24a or a position of the second document guide 24b. The first document guide 24a and the second document guide 24b are positioned to regulate the edges of the set document 200. Therefore, the first document guide 24a and the second document guide 24b are positioned in accordance with a width of the set document 200 in the main scanning direction. For example, the main scanning width detector 25 includes a variable resistor. A resistance value of the variable resistor depends on the position of the first document guide 24a, for example. Specifically, the resistance value corresponds to a size of the set document 200 in the main scanning direction. The controller 201 recognizes the resistance value based on an output of the main scanning width detector 25. For example, the storage 6 stores resistance value data D1 which defines a main scanning width for the resistance value. The controller 201 detects a width of the document 200 in the main scanning direction based on the resistance value. Note that another type of sensor, such as an optical sensor, may be used for the main scanning width detector 25 instead of the variable resistor.

As shown in FIG. 4, the image reading device 1 has the document table 11. The document table 11 is transparent. For example, the document table 11 is a rectangular flat glass plate. For example, the document table 11 is mounted on an upper surface of the image reading device 1 so that a plane thereof is horizontal.

Below the document table 11, the front-surface reader 12 is disposed. The front-surface reader 12 includes a first moving frame 12a, a second moving frame 12b, a front-surface lens 12c, and a front-surface line sensor 12d. The first moving frame 12a includes a front-surface irradiation lamp 12e and a mirror. The second moving frame 12b includes a plurality of mirrors. When reading the document 200, the controller 201 causes the front-surface irradiation lamp 12e to irradiate the front surface of the document 200 with light. Each of the mirrors is illuminated by the front-surface irradiation lamp 12e and guides light reflected by the document 200 to the front-surface lens 12c. Light passing through the front-surface lens 12c enters the front-surface line sensor 12d.

The first moving frame 12a and the second moving frame 12b are movable in the sub-scanning direction by the movement mechanism 13. The movement mechanism 13 includes, for example, a movement motor (not shown) and a wire (not shown). The wire is bridged over a plurality of pulleys, and one end of the wire is connected to a drum and the other end is connected to the first moving frame 12a and the second moving frame 12b. The controller 201 rotates the movement motor to rotate the drum. Accordingly, each of the moving frames moves in the sub-scanning direction. The controller 201 can move the first moving frame 12a and the second moving frame 12b in the sub-scanning direction. In other words, the controller 201 can move a front-surface reading position P1 (a position of a reading line). The front-surface reader 12 reads the front surface (one side facing the document table 11) of the document 200 being conveyed at the front-surface reading position P1. When reading the document 200 being conveyed, the controller 201 fixes the positions of the first moving frame 12a and the second moving frame 12b.

When the document 200 is placed on the document table 11, the controller 201 moves the first moving frame 12a and the second moving frame 12b in the sub-scanning direction from one end of the document 200 to the other end of the document 200. In other words, the front-surface reading position P1 is moved in the sub-scanning direction, and the entire surface of the placed document 200 is read.

The document conveying device 2 has a document conveying path 26 extending from the document tray 21 to the document discharge tray 22. A space for document conveyance formed by a plurality of conveyance guides is the document conveying path 26. As shown in FIG. 4, viewed from the front of the multifunction peripheral 100, the document conveying path 26 is U-shaped or C-shaped.

The document conveying device 2 includes a document conveyer 27. The document conveyer 27 conveys the document 200 along the document conveying path 26. As the document conveyer 27, for example, a pickup roller 27a, a paper feed roller pair 27b, a first conveyance roller pair 27c, a second conveyance roller pair 27d, a third conveyance roller pair 27e, a registration roller 27f, a fourth conveyance roller pair 27g, a fifth conveyance roller pair 27h, and a paper discharge roller pair 27i are provided. The document conveying device 2 further includes a roller driver 28 as the document conveyer 27. The roller driver 28 includes a conveyance motor, a gear, and other components. When conveying the document 200, the controller 201 rotates the conveyance motor. When the conveyance motor is rotated, the individual rollers in the document conveyer 27 rotate.

The pickup roller 27a feeds the documents 200 set in the document tray 21 one by one. The fed document 200 enters the document conveying path 26. The paper feed roller pair 27b feeds the picked-up document 200 downstream. The first conveyance roller pair 27c, the second conveyance roller pair 27d, the third conveyance roller pair 27e, the registration roller 27f, the fourth conveyance roller pair 27g, the fifth conveyance roller pair 27h, and the paper discharge roller pair 27i convey the document 200 along the document conveying path 26. The number of rollers for the document conveyance may be even greater. Installation intervals of the rollers may be set such that even a small-sized document 200, such as a business card, can be conveyed.

The document 200 is conveyed in the conveying path 26 toward the front-surface reading position P1 of the front-surface reader 12. The conveyed document 200 passes the front-surface reading position P1 during the conveyance. When the document 200 passes the front-surface reading position P1, the front-surface reader 12 reads the front surface of the document 200 (a skim-through method). Note that the document 200 is set on the document tray 21 with the front surface facing upward. The front-surface line sensor 12d outputs image signals corresponding to individual pixels as a result of the reading. Note that a reading width (a width in the main scanning direction) of the front-surface line sensor 12d is larger than a main scanning width of the document 200 of a largest size that can be conveyed. The controller 201 processes the image signals so as to generate front-surface document image data 400.

The document conveying device 2 further incorporates the back-surface reader 23. The back-surface reader 23 reads a back surface (a second surface or the other side) of the document 200. The back-surface reader 23 includes a back-surface irradiation lamp 23a, a back-surface lens 23b, and a back-surface line sensor 23c. The back-surface reader 23 includes a plurality of mirrors. The controller 201 causes the back-surface irradiation lamp 23a to irradiate a back surface of the document 200 being conveyed with light.

In the back-surface reader 23, a position of the reading line (a back-surface reading position P2) is not moved. Each of the mirrors is illuminated by the back-surface irradiation lamp 23a and guides light reflected by the back surface of the document 200 to the back-surface lens 23b. Light passing through the back-surface lens 23b enters the back-surface line sensor 23c. The back-surface reader 23 reads the back surface of the document 200 being conveyed at the back-surface reading position P2. The back-surface reading position P2 is positioned downstream relative to the front-surface reading position P1 in the document conveyance direction when the document 200 is conveyed. The paper discharge roller pair 27i discharges the document 200 that has passed the back-surface reading position P2 into the document discharge tray 22. The back-surface line sensor 23c outputs image signals corresponding to individual pixels as a result of the reading. A reading width (a width in the main scanning direction) of the back-surface line sensor 23c is larger than the main scanning width of the document 200 of a largest size that can be conveyed. The controller 201 processes the image signals so as to generate back-surface document image data.

In addition, the document conveying device 2 includes a conveyance detector 29. The conveyance detector 29 includes a first conveyance sensor 29a, a second conveyance sensor 29b, a third conveyance sensor 29c, a fourth conveyance sensor 29d, and a fifth conveyance sensor 29e that are disposed along the document conveying path 26. Each of the conveyance sensors detects the document 200 being conveyed. Each of the conveyance sensors is, for example, an optical sensor. Furthermore, based on an output of each of the conveyance sensors, the controller 201 recognizes presence or absence of the document 200 in a detection area of a corresponding one of the conveyance sensors, arrival of a leading edge of the document 200 to the corresponding conveyance sensor, and passing of a trailing edge of the document 200 from the corresponding conveyance sensor.

A set sensor 210 is disposed on the document tray 21. The set sensor 210 detects whether the document 200 is placed on the document tray 21. The set sensor 210 is, for example, an optical sensor. Based on an output of the set sensor 210, the controller 201 recognizes whether the document 200 is being on the document tray 21.

Opposing Plate

Figure 5:
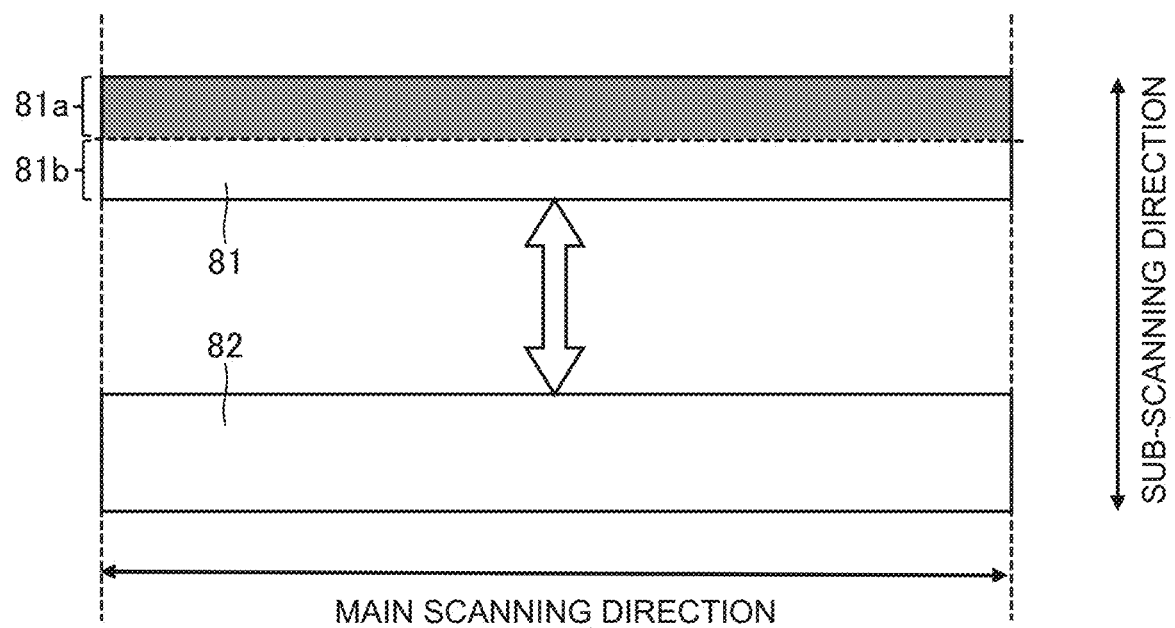
FIG. 5 is a diagram illustrating an example of an opposing plate according to the embodiment.

Next, an example of an opposing plate will be described with reference to FIGS. 4 and 5. FIG. 5 is a diagram illustrating an example of an opposing plate according to the embodiment.

The document conveying device 2 includes two opposing plates. Specifically, the document conveying device 2 includes a front-surface opposing plate 81 and a back-surface opposing plate 82.

As shown in FIG. 4, the front-surface reader 12 is disposed below the document table 11. On the other hand, the front-surface opposing plate 81 is disposed on an upper side of the document table 11. In other words, the front-surface opposing plate 81 is positioned facing the front-surface reader 12. The front-surface opposing plate 81 faces the front-surface irradiation lamp 12e with the document conveying path 26 interposed therebetween. The front-surface irradiation lamp 12e and the front-surface opposing plate 81 sandwich the document 200 being conveyed. Therefore, when the document 200 being conveyed is read, the front-surface irradiation lamp 12e irradiates the document 200 and the front-surface opposing plate 81 with light. Accordingly, the front-surface reader 12 also reads the front-surface opposing plate 81. The front-surface opposing plate 81 is read as a background of the document 200 being conveyed.

For example, the front-surface opposing plate 81 is a rectangular plate. The front-surface opposing plate 81 has the main scanning direction as its longitudinal direction. A width of the main scanning direction is larger than the main scanning width of the document 200 of a largest size that can be conveyed. As illustrated in FIG. 5, the front-surface opposing plate 81 has a gray portion 81a and a white portion 81b. A portion of a plane of the front-surface opposing plate 81 is the gray portion 81a, and the remaining portion is the white portion 81b. Both the gray portion 81a and the white portion 81b are in a form of strip and extend from one end to the other end of the front-surface opposing plate 81 in the main scanning direction. Therefore, the gray portion 81a and the white portion 81b have the main scanning direction as their longitudinal direction. Widths of the gray portion 81a and the white portion 81b in the sub-scanning direction are defined as appropriate.

The controller 201 can adjust positions of the first moving frame 12a and the second moving frame 12b at a time of reading. Specifically, the front-surface reader 12 can change the front-surface reading position P1 (a position of a reading line). Specifically, in a case of reading on a gray background, the controller 201 determines that the front-surface reading position P1 is included within the gray portion 81a. Accordingly, the front surface of the document 200 can be read on the gray background. On the other hand, in a case of reading on a white background, the controller 201 determines that the front-surface reading position P1 is included within the white portion 81b. Accordingly, the front surface of the document 200 can be read on the white background.

On the other hand, the back-surface opposing plate 82 is disposed opposite the back-surface reader 23 with the document conveying path 26 interposed therebetween. As illustrated in FIG. 4, the back-surface opposing plate 82 is disposed below the back-surface reader 23. The back-surface opposing plate 82 faces the back-surface irradiation lamp 23a. The back-surface irradiation lamp 23a and the back-surface opposing plate 82 sandwich the document 200 being conveyed. Therefore, when the document 200 being conveyed is read, the back-surface irradiation lamp 23a irradiates, in addition to the document 200, the back-surface opposing plate 82 with light. Accordingly, the back-surface reader 23 also reads the back-surface opposing plate 82. The back-surface opposing plate 82 is read as a background of the document 200 being conveyed.

For example, the back-surface opposing plate 82 is a rectangular plate. The back-surface opposing plate 82 has the main scanning direction as its longitudinal direction. A width of the main scanning direction is larger than the main scanning width of the document 200 of a largest size that can be conveyed. The back-surface opposing plate 82 is different from the front-surface opposing plate 81. The back-surface opposing plate 82 has one color. For example, the back-surface opposing plate 82 is white. When the back surface is read, the controller 201 causes the back-surface irradiation lamp 23a to irradiate the document 200 being conveyed and the back-surface opposing plate 82 with light. Accordingly, the back surface of the document 200 can be read on the white background.

Process of Cropping Document 200

Figure 6:
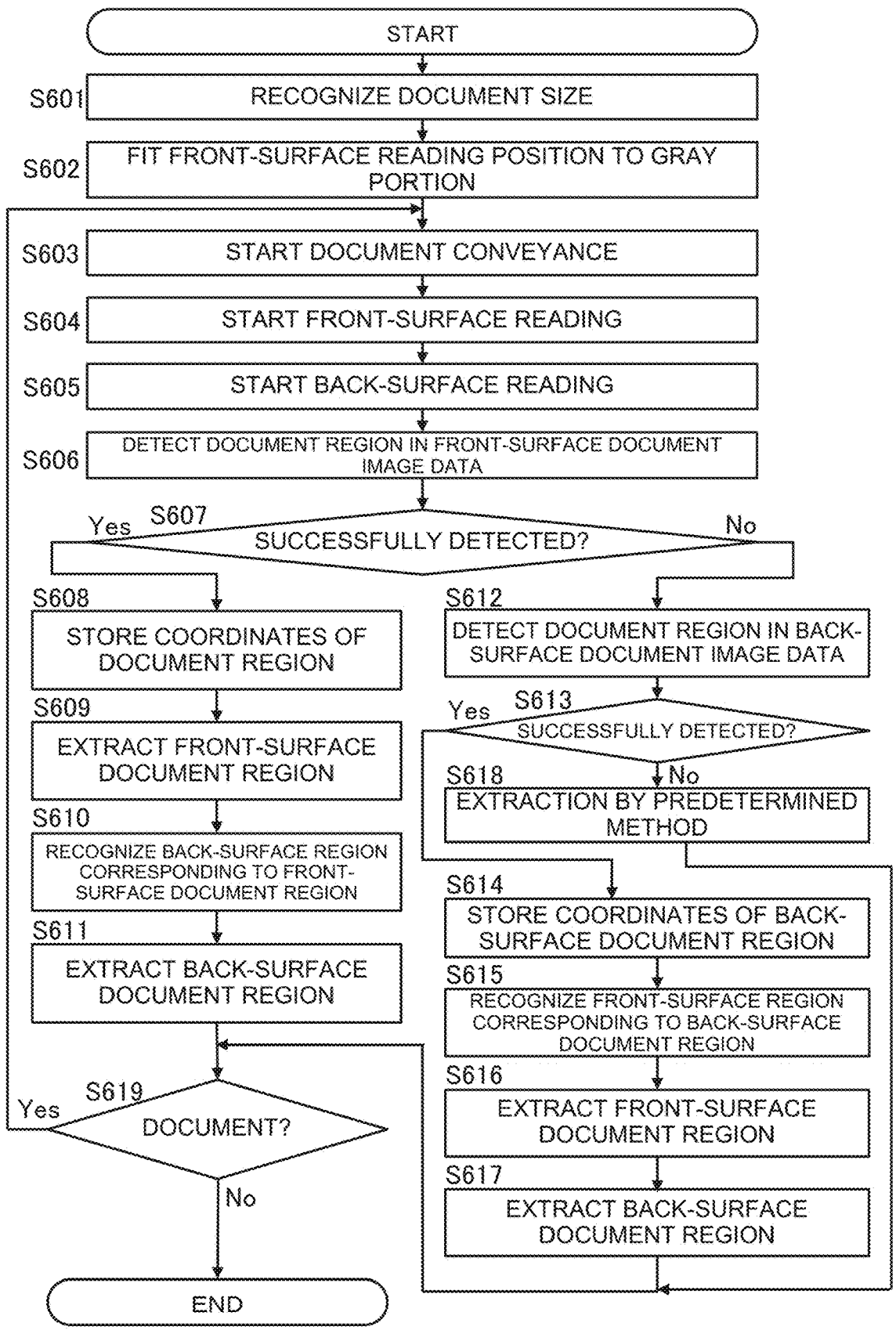
FIG. 6 is a flowchart of an example of a document cropping process according to the embodiment.
Figure 7:
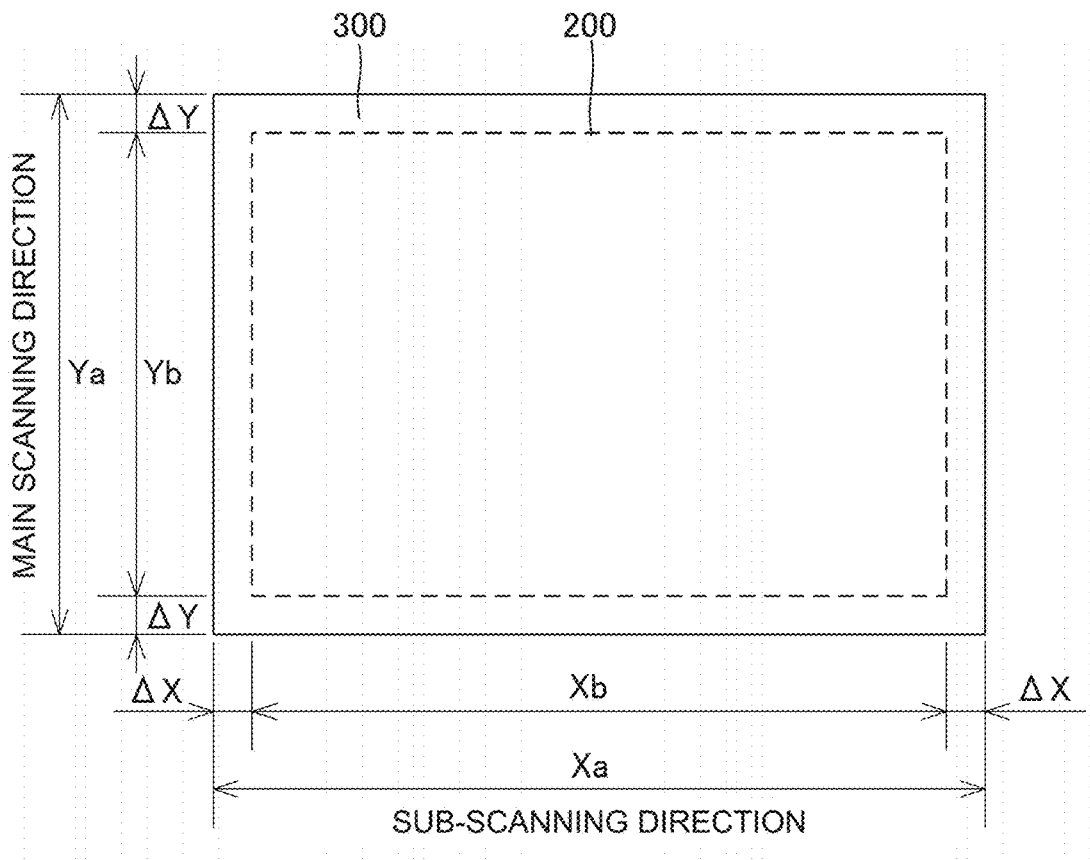
FIG. 7 is a diagram illustrating an example of a reading target region in the cropping process according to the embodiment.
Figure 8:
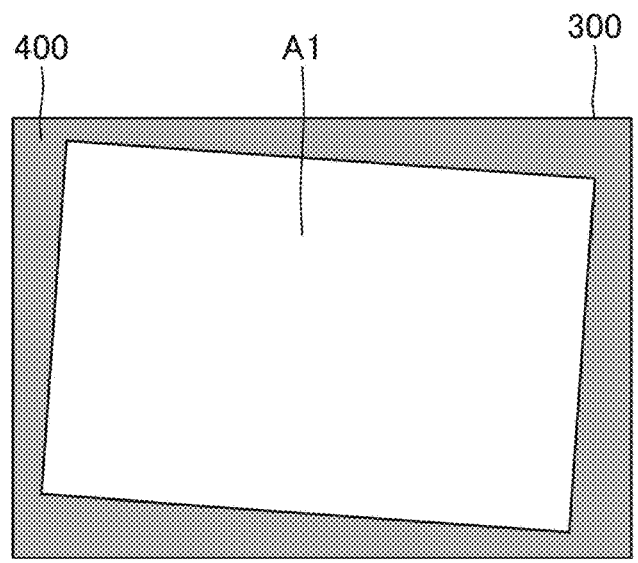
FIG. 8 is a diagram illustrating an example of front-surface document image data according to the embodiment.
Figure 9:
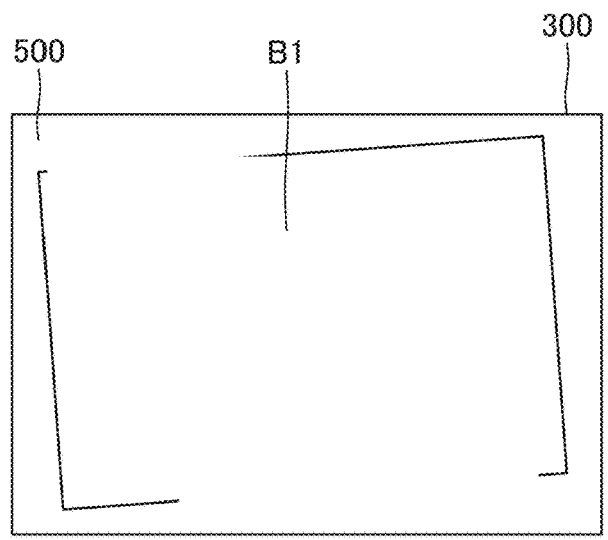
FIG. 9 is a diagram illustrating an example of back-surface document image data according to the embodiment.
Figure 10:
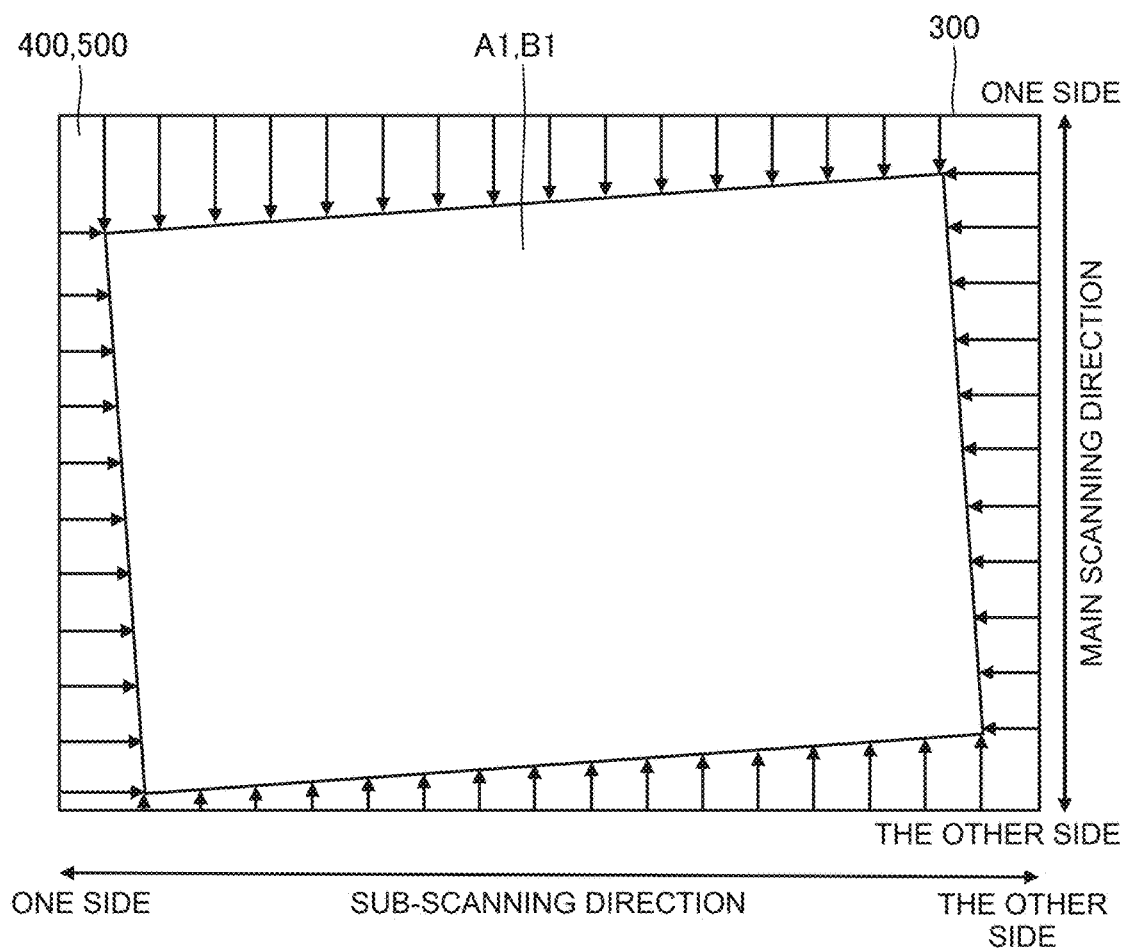
FIG. 10 is a diagram illustrating an example of a process of detecting a document region according to the embodiment.
Figure 11:
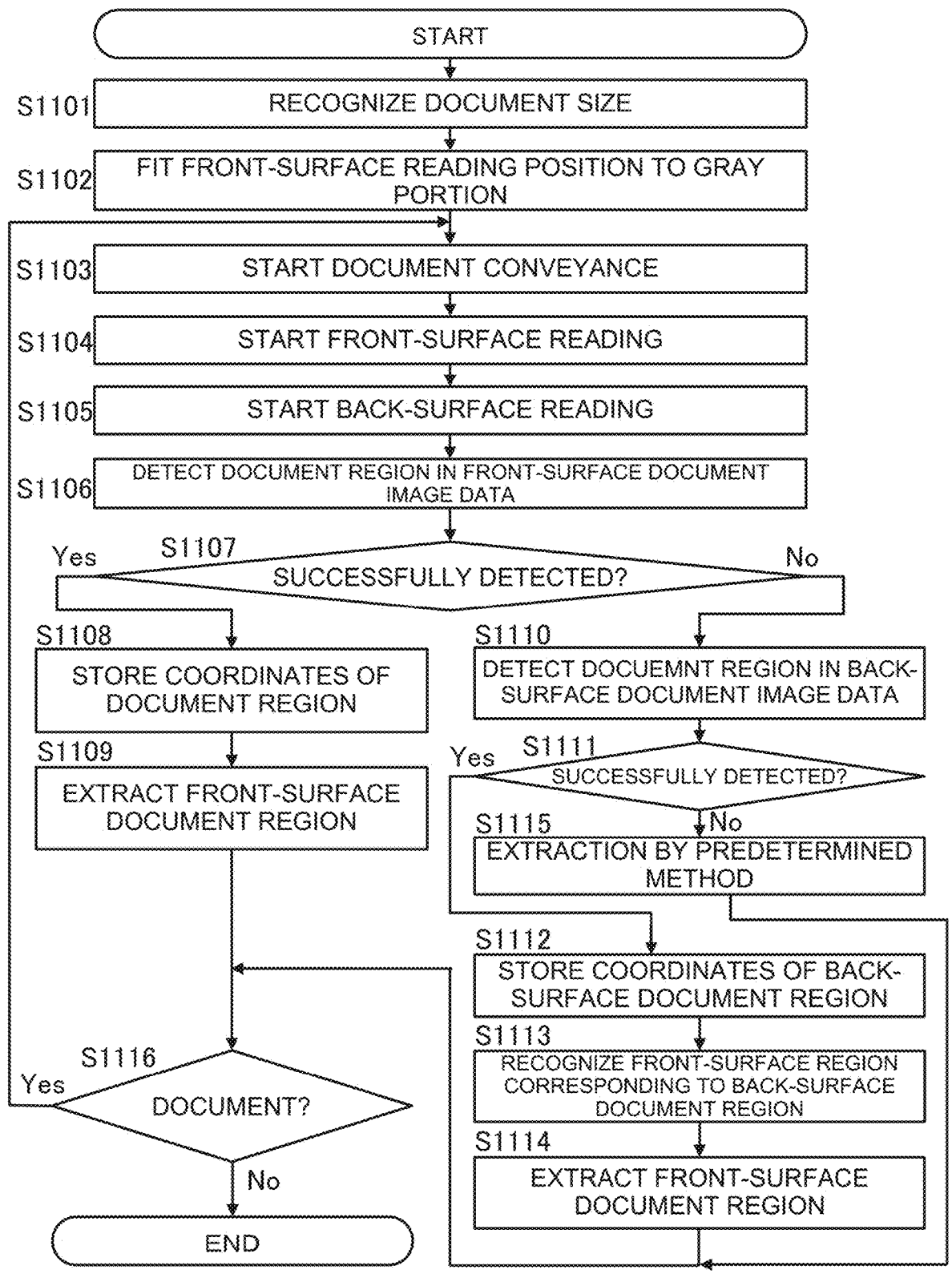
FIG. 11 is a flowchart of an example of the process of cropping a document according to the embodiment.

Next, an example of a process of cropping the document 200 will be described with reference to FIGS. 6 to 11. FIG. 6 is a flowchart of an example of a process of cropping the document 200 according to the embodiment. FIG. 7 is a diagram illustrating an example of a reading target region 300 in the cropping process according to the embodiment. FIG. 8 is a diagram illustrating an example of the front-surface document image data 400 according to the embodiment. FIG. 9 is a diagram illustrating an example of the back-surface document image data 500 according to the embodiment. FIG. 10 is a diagram illustrating an example of a process of detecting a document region according to the embodiment. FIG. 11 is a flowchart of an example of a process of cropping the document 200 according to the embodiment.

First, the document 200 may be conveyed at an angle. In this case, the document 200 is read at an angle. Therefore, the multifunction peripheral 100 has a document cropping function. When a document portion is copped and the inclination is corrected, image data that is not inclined is obtained. The operation panel 5 accepts a selection of enabling or disabling of the document cropping function. The document cropping function can be used for jobs that involve reading of the document 200, such as copying, scan-to-transmission, scan-to-storage, and faxing. When the document cropping function is used, a document portion is cropped from the image data and a job is executed based on cropped image data.

In order to accurately crop the document portion of the image data, the document reading device of the present disclosure includes a document conveyer 27, a first reader, a second reader, a region detector 206, and a cropping processor 207. The document conveyer 27 conveys the document 200 along the document conveying path 26. The first reader reads, at a first reading position of the document conveying path 26, a first surface of the document 200 being conveyed such that a read area is larger than the document 200 being conveyed. The second reader reads, at a second reading position of the document conveying path 26, a second surface that is opposite to the first surface such that a read area is larger than the document 200 being conveyed. The region detector 206 may execute a process of detecting a first document region included in the document 200 in first document image data obtained by reading on the first surface and a second document region included in the document 200 in the second document image data obtained by reading on the second surface. The cropping processor 207 crops a document portion in the first surface in the first document image data as first cropped image data and crops a document portion in the second surface in the second document image data as second cropped image data based on one of the first document region and the second document region that is successfully detected.

Therefore, a region corresponding to the document 200 may be detected in the image data corresponding to the front surface and the image data corresponding to the back surface of the document 200. Even when edges of the document 200 are not clearly represented in the front-surface image data, a document portion on the front surface and a document portion on the back surface may be reliably cropped based on a result of the detection on a back surface. Furthermore, even when the edges of the document 200 are not clearly represented in the back-surface image data, a document portion on the front surface and a document portion on the back surface may be reliably cropped based on a result of the detection on a front surface. Accordingly, the document portions may be reliably and accurately extracted.

In the following, an example in which the first reader corresponds to the front-surface reader 12, the first reading position corresponds to the front-surface reading position P1, the first surface corresponds to the front surface of the document 200, the second reader corresponds to the back-surface reader 23, the second reading position corresponds to the back-surface reading position P2, the second surface corresponds to the back surface of the document 200, the first document image data corresponds to the front-surface document image data 400, the second document image data corresponds to the back-surface document image data 500, the first document region corresponds to a front-surface document region A1 (a document portion) in the front-surface document image data 400, and the second document region corresponds to a back-surface document region B1 in the back-surface document image data 500 will be described. Furthermore, an example in which a first opposing plate corresponds to the front-surface opposing plate 81 and a second opposing plate corresponds to the back-surface opposing plate 82 will be described.

First, an example of output of the both sides of the document 200 will be described with reference to FIG. 6. For example, a double-sided transmission job that transmits image data of the both sides of the document 200, a double-sided copy job that prints image data of the both sides of the document 200, or a double-sided storage job that stores image data of the both sides of the document 200 corresponds to a job for outputting the both sides of the document 200.

Before start of the process in FIG. 6, the operation panel 5 accepts enabling of the document cropping function. The controller 201 recognizes that the document cropping function is enabled. Furthermore, the user has completed settings required for the job. For example, in the case of a scan-to-transmission job, the user has completed settings of a destination address, a reading resolution, and the like. In addition, the operation panel 5 accepts a selection to output the both sides of the document 200. Specifically, the controller 201 recognizes that the job is to be performed based on the image data of the both sides of the document 200.

The process of FIG. 6 is started when start of the job is indicated with the document cropping function enabled. For example, the process of FIG. 6 is started when the controller 201 recognizes an operation of a start button on the operation panel 5.

First, the controller 201 recognizes a size of the set document 200 (step S601). Specifically, the controller 201 recognizes a main scanning width based on an output of the main scanning width detector 25. A bundle of documents 200 in different sizes may also be set in the document tray 21. In this case, the controller 201 recognizes a size of the document 200 having the largest main scanning width among the set documents 200.

The controller 201 fits the front-surface reading position P1 to the gray portion 81a of the front-surface opposing plate 81 (step S602). Specifically, the controller 201 controls the movement motor for the movement mechanism 13 so that positions of the first moving frame 12a and the second moving frame 12b are controlled to read the gray portion 81a. Note that, in jobs that do not use the document cropping function, the controller 201 fits the front-surface reading position P1 to the white portion 81b.

Next, the controller 201 causes the document conveyer 27 to start conveyance of one of the documents 200 set in the document tray 21 (step S603). Specifically, controller 201 rotates the conveyance motor of the roller driver 28.

The front-surface reader 12 starts reading on the front surface of the document 200 being conveyed (step S604). Furthermore, the back-surface reader 23 starts reading on the back surface of the document 200 being conveyed (step S605). The image data generation circuit 204 processes image signals output from the front-surface line sensor 12d so as to generate front-surface document image data 400. Furthermore, the image data generation circuit 204 processes image signals output from the back-surface line sensor 23c so as to generate back-surface document image data 500.

Here, the front-surface reader 12 reads the front surface of the document 200 being conveyed such that a read area is larger than the document 200. Furthermore, the back-surface reader 23 reads the back surface of the document 200 being conveyed such that a read area is larger than the document 200. When the document cropping function is enabled, a reading target region 300 is set as illustrated in FIG. 7. The front-surface reader 12 and the back-surface reader 23 read a range of the reading target region 300.

The reading target region 300 is larger than the size of the document 200. First, in the main scanning direction of the document 200, a length Ya of the reading target region 300 is longer than a main scanning width Yb of the document 200. The controller 201 recognizes the main scanning width Yb of the document 200 based on the output of the main scanning width detector 25. Therefore, the controller 201 can obtain the length Ya of the reading target region 300. For example, the length Ya is longer by first additional widths $\Delta Y$ at both edge portions in the vertical direction in FIG. 7. The first additional width $\Delta Y$ is 5 mm, for example, irrespective of the size of the document 200.

Furthermore, in the sub-scanning direction of the document 200, a length Xa of the reading target region 300 is longer than a sub-canning width Xb of the document 200. For example, the length Xa is longer by second additional widths $\Delta X$ at both edge portions in the horizontal direction in FIG. 7. The second additional width $\Delta X$ is 5 mm, for example, irrespective of the size of the document 200. Specifically, the front-surface reader 12 and the back-surface reader 23 read extra the document 200 at the leading and trailing edges by the second additional width $\Delta X$.

For example, the controller 201 causes the front-surface reader 12 to start reading when the leading edge of the document 200 is conveyed to a point before the front-surface reading position P1 by the second additional width $\Delta X$. Furthermore, the controller 201 causes the front-surface reader 12 to terminate the reading when the document 200 is conveyed by the second additional width $\Delta X$ after the trailing edge of the document 200 passed the front-surface reading position P1. It is assumed that a conveyance speed of the document 200 is denoted by V1 and a distance from the third conveyance sensor 29c to an upstream point in the document conveyance direction by the second additional width ΔX from the front-surface reading position P1 is denoted by L1. For example, the controller 201 causes the front-surface reader 12 to start the reading when a period of time (L1÷V1) has elapsed after the third conveyance sensor 29c detects arrival of the leading edge of the document 200. Furthermore, it is assumed that a distance from the third conveyance sensor 29c to a downstream point in the document conveyance direction by the second additional width ΔX from the front-surface reading position P1 is denoted by L2. For example, the controller 201 causes the front-surface reader 12 to terminate the reading when a period of time (L2÷V1) has elapsed after the third conveyance sensor 29c detects passing of the trailing edge of the document 200. Accordingly, a range larger than the document 200 by 2×(second additional width ΔX) can be read.

FIG. 8 is a diagram illustrating an example of the front-surface document image data 400 obtained when the document cropping function is used. When the document cropping function is used, the gray portion 81a of the front-surface opposing plate 81 is determined as the background in the front-surface reading. Therefore, portions other than the document 200 (the front-surface document region A1) in the front-surface document image data 400 are gray. As illustrated in FIG. 8, when a ground color of the document 200 is white, the edges of the document 200 (boundaries between gray and the document 200) dearly appear in the image data.

Furthermore, the controller 201 causes the back-surface reader 23 to start reading when the leading edge of the document 200 is conveyed to a point before the back-surface reading position P2 by the second additional width ΔX. Furthermore, the controller 201 causes the back-surface reader 23 to terminate the reading when the document 200 is conveyed by the second additional width ΔX after the trailing edge of the document 200 passed the back-surface reading position P2. It is assumed that a distance from the fourth conveyance sensor 29d to a point upstream the back-surface reading position P2 in the document conveyance direction by the second additional width ΔX is denoted by L3. For example, the controller 201 causes the back-surface reader 23 to start the reading when a period of time (L3÷V1) has elapsed after the fourth conveyance sensor 29d detects arrival of the leading edge of the document 200. It is further assumed that a distance from the fourth conveyance sensor 29d to a point upstream the back-surface reading position P2 in the document conveyance direction by the second additional width ΔX is denoted by L4. For example, the controller 201 causes the back-surface reader 23 to terminate the reading when a period of time (L4÷V1) has elapsed after the fourth conveyance sensor 29d detects passing of the trailing edge of the document 200. Accordingly, a range larger than the document 200 by 2×(second additional width ΔX) can be read.

FIG. 9 is a diagram illustrating an example of the back-surface document image data 500 obtained when the document cropping function is used. When the document cropping function is used, the white back-surface opposing plate 82 is used as the background in the back-surface reading. Therefore, portions other than the document 200 (the back-surface document region B1) in the back-surface document image data 500 are white. Note that, as illustrated in FIG. 9, when a ground color of the document 200 is white, portions of the edges of the document 200 may not clearly appear in the image data.

Then, the region detector 206 performs a process of detecting a front-surface document region A1 in the front-surface document image data 400 (step S606). Then, the region detector 206 determines whether the detection of the front-surface document region A1 has been successfully performed in the front-surface document image data 400 (step S607).

Next, an example of the process of detecting a document region will be described with reference to FIG. 10. The region detector 206 detects pixels of edges (end portions) of the document 200 of at least one of the front-surface document image data 400 and the back-surface document image data 500. For example, the region detector 206 determines edge candidate pixels having an absolute value of a difference between density values (pixel values) of pixels adjacent to each other in the main scanning direction that is equal to or larger than a predetermined threshold on one pixel basis for each line in the main scanning direction of the document image data. In each line in the main scanning direction, the region detector 206 determines a pixel positioned nearest one side in the main scanning direction among the edge candidate pixels to be an edge pixel on the one side in the main scanning direction. In each line in the main scanning direction, the region detector 206 determines a pixel positioned nearest the other side in the main scanning direction among the edge candidate pixels to be an edge pixel on the other side in the main scanning direction.

The region detector 206 performs the same process for the sub-scanning direction. For example, the region detector 206 determines edge candidate pixels having an absolute value of a difference between density values (pixel values) of pixels adjacent to each other in the sub-scanning direction that is equal to or larger than a predetermined threshold on one pixel basis for each line in the sub-scanning direction of the document image data. In each line in the sub-scanning direction, the region detector 206 determines a pixel positioned nearest one side in the sub-scanning direction among the edge candidate pixels to be an edge pixel on the one side in the sub-scanning direction. In each line in the sub-scanning direction, the region detector 206 determines a pixel positioned nearest the other side in the sub-scanning direction among the edge candidate pixels to be an edge pixel on the other side in the sub-scanning direction.

The region detector 206 checks a distance in the main scanning direction of each edge pixel at the one end in the main scanning direction for each combination of lines in the main scanning direction that include edge pixels and are adjacent to each other in the sub-scanning direction. When an absolute value of the checked distance exceeds a predetermined reference value, the region detector 206 may determine that detection of the document region has failed. This is because it is possible to determine that unevenness of the edges of the document region is too large. Furthermore, the region detector 206 checks a distance in the main scanning direction of each edge pixel at the other end in the main scanning direction for each combination of lines in the main scanning direction that include edge pixels and are adjacent in the sub-scanning direction. When an absolute value of the checked distance exceeds a predetermined reference value in one of the edge pixels, the region detector 206 may determine that detection of the document region has failed. Furthermore, the region detector 206 checks a distance in the sub-canning direction of each edge pixel at the one end in the sub-canning direction for each combination of lines in the sub-scanning direction that include edge pixels and are adjacent in the sub-scanning direction. When an absolute value of the checked distance exceeds a predetermined reference value in one of the edge pixels, the region detector 206 may determine that detection of the document region has failed. Furthermore, the region detector 206 checks a distance in the sub-canning direction of each edge pixel at the other end in the sub-canning direction for each combination of lines in the sub-scanning direction that include edge pixels and are adjacent in the sub-scanning direction. When an absolute value of the checked distance exceeds a predetermined reference value in one of the edge pixels, the region detector 206 may determine that detection of the document region has failed. When an absolute value of the checked distance exceeds a predetermined reference value in none of the edge pixels, the region detector 206 may determine that the detection of the document region has been successively performed.

For example, the region detector 206 detects a region surrounded by the edge pixels on the one end in the main scanning direction, the edge pixels on the other end in the main scanning direction, the edge pixels on the one end in the sub-scanning direction, and the edge pixels on the other end in the sub-scanning direction as the document region. Note that the region detector 206 may detect a document region using an algorithm other than the algorithm described above.

For example, when four sides are not detected in the region surrounded by the edge pixels on the one end in the main scanning direction, the edge pixels on the other end in the main scanning direction, the edge pixels on the one end in the sub-scanning direction, and the edge pixels on the other end in the sub-scanning direction, the region detector 206 may determine that the detection of a document region has failed. Alternatively, when four sides are not detected but less than four sides (e.g., three sides) are detected and an angle between adjacent sides is not substantially a right angle, the region detector 206 may determine that the detection of a document region has failed. Alternatively, when four sides are detected but the angles of adjacent sides vary, the region detector 206 may determine that the detection of a document region has failed. Alternatively, when four sides are detected and the angles of adjacent sides are substantially at right angles with uniformity, the region detector 206 may determine that the detection of a document region has been successfully performed.

When the document region A1 on the front surface is successfully detected in the front-surface document image data 400 (Yes in step S607), the region detector 206 stores coordinates (positional information) of the front-surface document region A1 that has been successfully detected in the storage 6 (Step S608).

Then, the cropping processor 207 crops the front-surface document region A1 from the surface document image data 400 as front-surface cropped image data (step S609). The cropping processor 207 performs a process of correcting a skew of the front-surface cropped image data that has been cropped.

When both sides of the document 200 are to be output, the cropping processor 207 recognizes a region of the back surface corresponding to the front-surface document region A1 (a back-surface corresponding region) in the back-surface document image data 500 based on the front-surface document region A1 (refer to step S610).

For example, the cropping processor 207 may generate inverted image data by vertically and horizontally inverting the front-surface document image data 400. For example, the vertical direction is the main scanning direction and the horizontal direction is the sub-scanning direction. Then, the cropping processor 207 recognizes coordinates of the front-surface document region A1 in the inverted image data obtained by the vertical and horizontal inversion as coordinates of the back-surface corresponding region. For example, the cropping processor 207 recognizes coordinates of four corners (upper right, upper left, lower right, and lower left) of the front-surface document region B1 in the inverted image data obtained by the vertical and horizontal inversion. The cropping processor 207 recognizes a range of a rectangle with the recognized coordinates as vertices in the back-surface document image data 400 as the back-surface corresponding region.

Then, the cropping processor 207 crops the range corresponding to the back-surface corresponding region in the back-surface document image data 500 as back-surface cropped image data (step S611). The cropping processor 207 performs a process of correcting a skew of the back-surface cropped image data that has been cropped.

In this way, when the region detector 206 successfully detects a first document region (the front-surface document region A), the cropping processor 207 crops the first document region of the first document image data (the front-surface document image data 400) as first cropped image data (front-surface cropped image data). Furthermore, the cropping processor 207 obtains coordinates of a second corresponding region corresponding to the first document region (a back-surface corresponding region) in the second document image data (the back-surface document image data 500). Then, the cropping processor 207 crops the second corresponding region in the second document image data as second cropped image data (back-surface cropped image data). Accordingly, the document regions of the respective surfaces of the document 200 can be cropped based on the position of the document region successfully detected on the first surface (the front surface). Specifically, based on the coordinates of the document region successfully detected on the first surface, the document region on the first surface and the document region on the second surface (the back surface) can be accurately cropped.

Specifically, the cropping processor 207 vertically and horizontally inverts the first document image data (the front-surface document image data 400). Then, the cropping processor 207 recognizes the second corresponding region based on the coordinates of the first document region (the front-surface document region A) that is vertically and horizontally inverted. Then, the cropping processor 207 crops the second cropped image data. Accordingly, the document region can be accurately extracted from the second document image data (the back-surface document image data 500) based on a result of the detection of the first document image data. Specifically, the document region can be accurately cropped even when the document 200 is conveyed at an angle.

Here, when the region detector 206 successfully detects the first document region (the front-surface document region A), the cropping processor 207 does not perform the process of detecting the second document region (the back-surface document region B1). The detection of a document region is not always performed on both the front surface and the back surface. When detection is successfully performed on the front surface, the detection for the back surface is skipped. The process of cropping a document region can efficiently reduce an amount of calculation and an amount of processing. A period of time required for the process of cropping a document region can be reduced.

On the other hand, a case where a detection of the front-surface document region A1 has failed in the front-surface document image data 400 (No in step S607) will be described. In this case, a process of detecting the back-surface document region B1 in the back-surface document image data 500 is performed (step S612). The region detector 206 performs the process described with reference to FIG. 10 on the back-surface document image data 500. Then, the region detector 206 determines whether the detection of the back-surface document region B1 has been successfully performed (step S613) in the back-surface document image data 500.

When the back-surface document region B1 is successfully detected in the back-surface document image data 500 (Yes in step S613), the region detector 206 stores coordinates (positional information) of the back-surface document region B1 (the second document region) that has been successfully detected in the storage 6 (step S614).

Then the cropping processor 207 recognizes a region on the front surface corresponding to the back-surface document region B1 (a front-surface corresponding region) in the front-surface document image data 400 based on the back-surface document region B1 (step S615).

For example, the cropping processor 207 may generate inverted image data by vertically and horizontally inverting the back-surface document image data 500. For example, the vertical direction is the main scanning direction and the horizontal direction is the sub-scanning direction. Then, the cropping processor 207 recognizes coordinates of the back-surface document region B1 on the back surface in the inverted image data obtained by the vertical and horizontal inversion as coordinates of the front-surface corresponding region. For example, the cropping processor 207 recognizes coordinates of four corners (upper right, upper left, lower right, and lower left) of the back-surface document region B1 that is vertically and horizontally inverted in the inverted image data. The cropping processor 207 recognizes a range of a rectangle with the recognized coordinates as vertices in the front-surface document image data 400 as the front-surface corresponding region.

Then, the cropping processor 207 crops the range corresponding to the front-surface corresponding region in the front-surface document image data 400 as front-surface cropped image data (step S616). The cropping processor 207 performs a process of correcting a skew of the front-surface cropped image data that has been cropped.

In this way, when the region detector 206 has failed to detect the first document region (the front-surface document region A1) and has successfully performed detection of the second document region (the back-surface document region B1), the cropping processor 207 obtains coordinates of the first corresponding region (the front-surface corresponding region) corresponding to the second document region (the back-surface document region B1) in the first document image data (the front-surface document image data 400) so as to extract the first corresponding region from the first document image data as the first cropped image data (the front-surface cropped image data). Accordingly, even when the detection of the document region has failed on the first surface (the front surface), the document region on the first surface may be extracted based on a position of the document region successfully detected on the second surface (the back surface). The document region can be cropped based on coordinates of the document region successfully detected on one of the front surface and the back surface. Specifically, the cropping processor 207 vertically and horizontally inverts the second document image data (the back-surface document image data 500) and recognizes a first corresponding region based on the coordinates of the second document region that is vertically and horizontally inverted so that first cropped image data is extracted. Accordingly, the document region can be accurately extracted from the first document image data based on a result of the detection of the second document image data. Specifically, the document region can be accurately cropped even when the document 200 is conveyed at an angle.

Since the both sides of the document 200 is output, the cropping processor 207 crops the detected back-surface document region B1 from the back-surface document image data 500 as back-surface cropped image data (step S617). The cropping processor 207 performs a process of correcting a skew of the back-surface cropped image data that has been cropped.

Also in the back-surface document image data 500, when the detection of the back-surface document region B1 has failed (No in step S613), the cropping processor 207 crops the region based on a predetermined method (step S618). When the both surfaces of the document 200 are to be output, the cropping processor 207 extracts cropped image data from both the front-surface document image data 400 and the back-surface document image data 500 based on the predetermined method. When only one surface of the document 200 is to be output, the cropping processor 207 extracts cropped image data from the front-surface document image data 400 based on the predetermined method. The predetermined method will be described in detail hereinafter.

After step S611, step S617, or step S618, the controller 201 determines whether at least one document 200 has been set (step S619). In other words, the controller 201 determines whether at least one document 200 remains in the document tray 21. The controller 201 makes the determination based on an output of the set sensor 210. When no documents 200 remain (No in step S619), the controller 201 terminates the flowchart (END). When at least one document 200 remains (Yes in step S619), the controller 201 performs step S603 (returns to step S603). In other words, the reading, the region detection process, the cropping process, and the skew correction process are performed on the next document 200.

The extracted cropped image data is used for a job. In the case of a scan-to-transmission job, controller 201 causes the communicator 7 to transmit the extracted front-surface cropped image data and the extracted back-surface cropped image data. In the case of a copy job, the controller 201 causes the image former 3 to perform printing based on the extracted front-surface cropped image data and the extracted back-surface cropped image data. In the case of a scan-to-storage job, controller 201 generates a storage file including the extracted front-surface cropped image data and the extracted back-surface cropped image data. The controller 201 stores the generated storage file in the storage 6 or an external storage device on a non-volatile basis.

Here, the document reading device includes a first opposing plate (the front-surface opposing plate 81) and a second opposing plate (the back-surface opposing plate 82). The first opposing plate is disposed in a position facing the first reader (the front-surface reader 12) and is read by the first reader as a background of the document 200 being conveyed. The second opposing plate is disposed in a position facing the second reader (the back-surface reader 23) and is read by the second reader as a background of the document 200 being conveyed. One of the first and second opposing plates is gray and the other is white. Therefore, when the document 200 is read such that a read area is larger than the document 200, a color of an outside of the document 200 on the first surface (the front surface) and a color of an outside of the document 200 on the second surface (the back surface) may be differentiated from each other. The edges of the document 200 are more likely to be clearly visible in one of the front-surface document image data and the back-surface document image data. Accordingly, the probability of successful detection of the document region can be increased.

Specifically, the first reader (the front-surface reader 12) may change the first reading position (the front-surface reading position P1). Then the first opposing plate (the front-surface opposing plate 81) has the gray portion 81a and the white portion 81b with the main scanning direction as a longitudinal direction. When the document cropping function is set to be used, the first reader reads a position where the gray portion 81a is a background as the first reading position (the front-surface reading position P1). When the document cropping function is not set to be used, the first reader reads a position where the white portion 81b is a background as the first reading position. Accordingly, a color of the background in the reading on the first surface may be changed in accordance with a result of a determination as to whether the document 200 is to be cropped. In general, white paper is used in offices and companies. In a case where the document cropping function is not used, the background can be set to white so that the document image data does not include gray.

Next, an example of output of only one side (the front surface) of the document 200 will be described with reference to FIG. 11. For example, a one-sided transmission job that transmits image data of one side of the document 200, a one-sided copy job that performs printing based on image data of one side of the document 200, or a one-sided storage job that stores image data of one side of the document 200 corresponds to a job for outputting one side of the document 200.

Before start of the process in FIG. 11, the operation panel 5 accepts enabling of the document cropping function. The controller 201 recognizes that the document cropping function is enabled. Furthermore, the user has completed settings required for the job. For example, in the case of a scan-to-transmission job, the user has completed settings of a destination address, a reading resolution, and the like. Furthermore, the operation panel 5 accepts a selection for outputting only one side of the document 200. Specifically, the controller 201 recognizes that the job is to be performed based on image data of one side of the document 200.

The process of FIG. 11 is started when start of the job is indicated with the document cropping function enabled. For example, the process of FIG. 11 is started when the controller 201 recognizes an operation of a start button on the operation panel 5.

First, a process from step S1101 to step S1109 is the same as the process from step S601 to step S609 described with reference to FIG. 6. Description of step S1101 to step S1109 are omitted since the description of step S601 to step S609 can be used.

Note that even when a job is set to output only one side (the front surface) of the document 200, the controller 201 causes both the front-surface reader 12 and the back-surface reader 23 to perform reading. In the case of output of only one side of the document 200, the cropping processor 207 may not perform extraction from the back-surface document image data 500. Therefore, the process of obtaining coordinates of the back-surface correspondence region and extraction of a range of the back-surface correspondence region are not performed.

A case where a detection of the front-surface document region A1 has failed in the front-surface document image data 400 (No in step S1107) will be described. In this case, the region detector 206 performs a process of detecting the back-surface document region B1 in the back-surface document image data 500 (step S1110). Then, the region detector 206 determines whether the detection of the back-surface document region B1 has been successfully performed (step S1111) in the back-surface document image data 500.

When the back-surface document region B1 is successfully detected in the back-surface document image data 500 (Yes in step S1111), the region detector 206 stores coordinates (positional information) of the back-surface document region B1 that has been successfully detected in the storage 6 (step S1112).

Then the cropping processor 207 recognizes a region on the front surface corresponding to the back-surface document region B1 (the front-surface corresponding region) in the front-surface document image data 400 based on the back-surface document region B1 (refer to step S1113).

For example, the cropping processor 207 may generate inverted image data by vertically and horizontally inverting the back-surface document image data 500. For example, the vertical direction is the main scanning direction and the horizontal direction is the sub-scanning direction. Then, the cropping processor 207 recognizes coordinates of the back-surface document region B1 on the back surface in the inverted image data obtained by the vertical and horizontal inversion as coordinates of the front-surface corresponding region. For example, the cropping processor 207 recognizes coordinates of four corners (upper right, upper left, lower right, and lower left) of the back-surface document region B1 that is vertically and horizontally inverted in the inverted image data. The cropping processor 207 recognizes a range of a rectangle with the recognized coordinates as vertices in the front-surface document image data 400 as the front-surface corresponding region.

Then, the cropping processor 207 crops the range corresponding to the front-surface corresponding region in the front-surface document image data 400 as front-surface cropped image data (step S1114). The cropping processor 207 performs a process of correcting a skew of the front-surface cropped image data that has been cropped. Note that, since only one side of the document 200 is output, the cropping processor 207 may not perform extraction of back-surface cropped image data.

Also in the back-surface document image data 500, when the detection of the back-surface document region B1 has failed (No in step S1111), the cropping processor 207 extracts the region based on a predetermined method (step S1115). When only one surface of the document 200 is to be output, the cropping processor 207 extracts cropped image data from the front-surface document image data 400 based on the predetermined method. The predetermined method will be described in detail hereinafter.

The extracted cropped image data is used for a job. In the case of a scan-to-transmission job, the controller 201 causes the communicator 7 to transmit the extracted front-surface cropped image data. In the case of a copy job, the controller 201 causes the image former 3 to perform printing based on the extracted front-surface cropped image data. In the case of a scan-to-storage job, the controller 201 generates a storage file including the extracted front-surface cropped image data. The controller 201 stores the generated storage file in the storage 6 or an external storage device on a non-volatile basis.

Case Where Detection of Document Region Has Failed on Front and Back Surfaces

Next, an example of the cropping process performed when a detection of both the front-surface document region and the back-surface document region fails will be described with reference to FIG. 7.

When the document cropping function is used, the controller 201 differentiates colors of the opposing plates for the front-surface reading and the back-surface reading. Even when a ground color of the document 200 is white, the gray background clearly shows the edges of the document 200 in the image data. Therefore, it is possible to accurately extract the document region. Since the reading is performed even when a background of the document 200 is gray or white, the edges of the document 200 are clearly shown in the image data. It is highly likely that the document region can be accurately cropped.

However, when the ground color of the document 200 is similar to the gray portion 81a of the front-surface opposing plate 81 and also similar to a color of the back-surface opposing plate 82, or when the document 200 is constituted by two colors, that is, white and gray, there is still little possibility that the detection of the document region fails in both the front-surface document image data 400 and the back-surface document image data 500. On the other hand, when the document cropping function is used, reading is performed on a region larger than the document 200. For example, edges of the front-surface document image data are colored by gray. Therefore, when the document cropping function is used, extraction is preferably performed from the document image data even when the document region may not be detected on both the front surface and the back surface.

The multifunction peripheral 100 provides a plurality of extraction methods. One of the methods may be selected. The operation panel 5 accepts the selection of a method to be used. The controller 201 (the cropping processor 207) extracts cropped image data using the selected method.

1. First Method

There are individual differences in document conveying devices. It may be likely that skew occurs in a certain direction. Therefore, as a first method, history is referred to so that a region to be extracted is determined in the document image data. That is, habits of the document conveying device 2 are taken into account.

First, the storage 6 stores positional information i1 including coordinates of the detected front-surface document region A1 (refer to FIG. 2). The storage 6 stores the positional information i1 for each size of the document 200. For example, for each document, the controller 201 stores coordinates of four corners (upper right, upper left, lower right, and lower left) of the detected front-surface document region A1 as the positional information i1 in the storage 6.

Then the cropping processor 207 determines an average region of first document regions detected by reading on a plurality of documents based on positional information of the plurality of documents. For example, the cropping processor 207 adds coordinate values of X coordinates in image data of the upper right corners of the plurality of documents to obtain a sum and divides the sum by the number of documents. For example, the cropping processor 207 adds coordinate values of Y coordinates in image data of the upper right corners of the plurality of documents to obtain a sum and divides the sum by the number of documents. The cropping processor 207 recognizes the obtained average value of the X coordinates and the obtained average value of the Y coordinates as a coordinate of the upper right corner of the average region. The cropping processor 207 performs similar operations for the upper left corner, the lower right corner, and the lower left corner. Then, the cropping processor 207 determines a rectangular region with the upper right corner, the upper left corner, the lower right corner, and the lower left corner that have been recognized as an average region. The cropping processor 207 extracts the determined average region in the front-surface document image data 400 as front-surface cropped image data.

When the extraction is performed also on the back surface so that the both surfaces of the document 200 is output, a region (an estimated region) corresponding to the average region is determined in the back-surface document image data 500. For example, the cropping processor 207 may generate inverted image data by vertically and horizontally inverting the front-surface document image data 400. Then, the cropping processor 207 recognizes coordinates of four corners of the average region obtained by the vertical and horizontal inversion as coordinates of four corners of the estimated region. For example, the cropping processor 207 recognizes a range of a rectangle with the recognized coordinates as vertices in the back-surface document image data 500 as the estimated range. The cropping processor 207 extracts the estimated region in the second document image data as second cropped image data.

As described above, the document reading device includes the storage 6. The storage 6 stores the positional information i1 including the coordinates of the detected first document region (the front-surface document region A). When the region detector 206 has failed to detect both the first document region and the second document region (the back-surface document region B1), the cropping processor 207 determines the average region of the first document region (the front-surface document region A1) detected by reading on a plurality of documents 200 based on the positional information of the plurality of documents 200 and extracts the average region from the first document image data (the front-surface document image data 400) as first cropped image data (front-surface cropped image data). The cropping processor 207 obtains coordinates of an estimated region corresponding to the average region in the second document image data (the back-surface document image data 500). The cropping processor 207 extracts the estimated region in the second document image data as second cropped image data (back-surface cropped image data). By this, a region with high probability of a document region may be extracted even when a detection of a document region fails on both the front surface and the back surface. In other words, the probability of cropping the document region without deviation can be increased while taking into account the individual differences among document reading devices.

2. Second Method

When a bundle of documents is set in the document tray 21 in an inclined state, the plurality of documents 200 may be conveyed while being inclined in the same direction. Therefore, as a second method, a region to be extracted is determined in document image data by referring to a previous document 200 that was read immediately before.

The cropping processor 207 extracts the same range as a region extracted as front-surface cropped image data in the one previous document 200 as front-surface cropped image data from the front-surface document image data 400. When extraction is performed also on the back surface so that both surfaces of the document 200 are output, the cropping processor 207 extracts the same range as a region extracted as back-surface cropped image data in the one previous document 200 as back-surface cropped image data from the back-surface document image data 500.

When the region detector 206 has thus failed to detect both the first document region (the front-surface document region A) and the second document region (the back-surface document region B1), the cropping processor 207 extracts the same range as a region extracted as first clopped image data (front-surface cropped image data) in the one previous document 200 as first cropped image data from the first document image data (the front-surface document image data 400). The cropping processor 207 extracts the same range as the region extracted as the second cropped image data (the back-surface cropped image data) in the one previous document 200 as second cropped image data from the second document image data (the back-surface document image data 500). By this, a region with high probability of a document region may be extracted even when a detection of a document region fails on both the front surface and the back surface. In other words, the probability of cropping the document region without deviation can be increased while taking into account the inclination of the set bundle of documents.

3. Third Method

The front-surface reader 12 and the back-surface reader 23 read the document 200 such that a read area is larger than the document 200. A size of the region is predetermined. As illustrated in FIG. 7, the multifunction peripheral 100 performs reading with margins of 5 mm on one end side in the main scanning direction, 5 mm on the other end side in the main scanning direction, 5 mm on one end side in the sub-scanning direction, and 5 mm on the other end side in the sub-scanning direction relative to the document 200.

Therefore, the cropping processor 207 may extract a range inside a predetermined inner frame in the front-surface cropped image data as front-surface cropped image data. When extraction is performed also on the back surface so that both surfaces of the document 200 are output, the cropping processor 207 may extract a range inside the inner frame in the back-surface cropped image data as the back-surface cropped image data.

The inner frame corresponds to positions of edges of the document 200 that is not inclined. The inner frame has a rectangular shape, for example. An area of the inner frame is smaller than an area of the document image data. A position of the inner frame is predetermined. Two sides of the rectangle of the inner frame are parallel to the main scanning direction. The other two sides of the rectangle of the inner frame are parallel to the sub-scanning direction. One of the sides of the rectangle is located 5 mm inward from one end of the document image data in the main scanning direction, one of the remaining sides is located 5 mm inward from the other end of the document image data in the main scanning direction, one of the remaining sides is located 5 mm inward from one end of the document image data in the sub-scanning direction, and a last one of the sides is located 5 mm inward from the other end of the document image data in the sub-scanning direction.

Other Application Examples

The above description is merely an example of the present disclosure, and does not limit a technical scope of the present disclosure. Specifically, the present disclosure may be applied to aspects other than this example.

In the description above, the example has been described in which the first reader corresponds to the front-surface reader 12, the first reading position corresponds to the front-surface reading position P1, the first surface corresponds to the front surface of the document 200, the second reader corresponds to the back-surface reader 23, the second reading position corresponds to the back-surface reading position P2, the second surface corresponds to the back surface of the document 200, the first document image data corresponds to the image data of the front surface of the document 200 (the front-surface document image data 400), the second document image data corresponds to the image data of the back surface of the document 200 (the back-surface document image data 500), the first document region corresponds to the front-surface document region A1 (the document portion) in the front-surface document image data 400, and the second document region corresponds to the back-surface document region B1 (the document portion) in the back-surface document image data 500. Furthermore, the example has been described in which the first opposing plate is for the front-surface reader 12 (the front-surface opposing plate 81) and the second opposing plate is for the back-surface reader 23 (the back-surface opposing plate 82).

However, the first reader may correspond to the back-surface reader 23, the first reading position may correspond to the back-surface reading position P2, the first surface may correspond to the back surface of the document 200, the second reader may correspond to the front-surface reader 12, the second reading position may correspond to the front-surface reading position P1, the second surface may correspond to the front surface of the document 200, the first document image data may correspond to the image data of the back surface of the document 200 (the back-surface document image data 500), the second document image data may correspond to the image data of the front surface of the document 200 (the front-surface document image data 400), the first document region may correspond to the document region (the document portion) in the back-surface document image data 500, and the second document region may correspond to the document region (the document portion) in the front-surface document image data 400. Furthermore, the first opposing plate may be for the back-surface reader 23 (the back-surface opposing plate 82) and the second opposing plate may be for the front-surface reader 12 (the front-surface opposing plate 81).

Furthermore, the present disclosure may also be regarded as a method for controlling a document reading device. Specifically, a method for controlling a document reading device according to the present disclosure includes conveying the document 200 along the document conveying path 26, reading, in the first reading position in the document conveying path 26, the first surface of the conveyed document 200 such that a read area is larger than the conveyed document 200, reading, in the second reading position in the document conveying path 26, the second surface that is opposite to the first surface such that a read area is larger than the conveyed document 200, detecting a first document region that is a region of the document 200 in the first document image data obtained by the reading on the first surface, detecting a second document region that is a region of the document 200 in the second document image data obtained by the reading on the second surface, and cropping a document portion on the first surface from the first document image data as first cropped image data and cropping a document portion on the second surface from the second document image data as second cropped image data, based on one of the first and second document regions that is successfully detected.

According to this method, a region corresponding to the document 200 may be detected in the image data corresponding to the front surface and the image data corresponding to the back surface of the document 200. Even when edges of the document 200 are not clearly represented in the front-surface image data, a document portion on the front surface and a document portion on the back surface may be reliably cropped based on a result of the detection on a back surface. Furthermore, even when the edges of the document 200 are not dearly represented in the back-surface image data, a document portion on the front surface and a document portion on the back surface may be reliably cropped based on a result of the detection on a front surface. Accordingly, a document portion may be reliably and accurately extracted.

What is claimed is:

1. A document reading device, comprising:
    a document conveyer that conveys a document along a document conveying path;
    a first reader that reads, in a first reading position in the document conveying path a first surface of the conveyed document such that a read area is larger than the conveyed document;
    a second reader that reads, in a second reading position in the document conveying path, a second surface that is opposite to the first surface such that another read area is larger than the conveyed document;
    a region detector capable of executing a process of detecting a first document region that is a region of a document in a first document image data obtained by the reading on the first surface and a process of detecting a second document region that is a region of the document in a second document image data obtained by the reading on the second surface; and
    a cropping processor that crops a document portion on the first surface from the first document image data as first cropped image data, and crops a document portion on the second surface from the second document image data as second cropped image data, based on one of the first and second document regions that is successfully detected wherein,
    when the region detector fails to detect the first document region and successfully detects the second document region, the cropping processor recognizes a first corresponding region that corresponds to the second document region in the first document image data and crops the first corresponding region from the first document image data as the first cropped image data.

2. The document reading device according to claim 1, wherein the cropping processor vertically and horizontally inverts the second document image data and recognizes the first corresponding region based on coordinates of the second document region that is vertically and horizontally inverted so that the first cropped image data is cropped.

3. The document reading device according to claim 1, further comprising:
    a first opposing plate that is disposed in a position facing the first reader and that is to be read by the first reader as a background of the conveyed document; and
    a second opposing plate that is disposed in a position facing the second reader and that is to be read by the second reader as another background of the conveyed document, wherein
    one of the first opposing plate and the second opposing plate is colored in gray and the other is colored in white.

4. The document, reading device according to claim 3, wherein
    the first reader is capable of changing the first reading position,
    the first opposing plate has a gray portion and a white portion extending with a main scanning direction as a longitudinal direction,
    when a document cropping function is set to be used, the first reader performs reading at a position where the gray portion corresponds to a background as the first reading position, and
    when the document cropping function is not set to be used, the first reader performs reading at a position where the white portion corresponds to the background as the first reading position.

5. The document reading device according to claim 1, further comprising:
    a storage that stores positional information including coordinates of the detected first document region, wherein
    when the region detector fails to detect both the first document region and the second document region, the cropping processor
        determines an average region of the first document regions detected by reading performed on a plurality of documents based on the positional information of the plurality of documents and crops the average region from the first document image data as the first cropped image data, and
        determines an estimated region corresponding to an average region in the second document image data and crops the estimated region in the second document image data as the second cropped image data.

6. The document reading device according to claim 1, wherein when the region detector fails to detect both the first document region and the second document region, the cropping processor
    crops a range corresponding to a region cropped as the first cropped image data in the immediately preceding conveyed document from the first document image data as the first cropped image data, and
    crops a range corresponding to a region cropped as the second cropped image data in the immediately preceding conveyed document from the second document image data as the second cropped image data.

7. A document reading device, comprising:
    a document conveyer that conveys a document along a document conveying path;
    a first reader that reads, in a first reading position in the document conveying path, a first surface of the conveyed document such that a read area is larger than the conveyed document;
    a second reader that reads, in a second reading position in the document conveying path, a second surface that is opposite to the first surface such that another read area is larger than the conveyed document;
    a region detector capable of executing a process of detecting a first document region that is a region of a document in a first document image data obtained by the reading on the first surface and a process of detecting a second document region that is a region of the document in a second document image data obtained by the reading on the second surface; and
    a cropping processor that crops a document portion on the first surface from the first document image data as first cropped image data, and crops a document portion on the second surface from the second document image data as second cropped image data, based on one of the first and second document regions that is successfully detected, wherein, when the region detector successfully detects the first document region, the cropping processor crops the first document region of the first document image data as the first cropped image data, recognizes a second corresponding region corresponding to the first document region in the second document image data, and crops the second corresponding region in the second document image data as the second cropped image data.

8. The document reading device according to claim 7, wherein the cropping processor vertically and horizontally inverts the first document image data and recognizes the second corresponding region based on coordinates of the first document region that is vertically and horizontally inverted so that the second cropped image data is cropped.

9. A document reading device, comprising:
- a document conveyer that conveys a document along a document conveying path;
- a first reader that reads, in a first reading position in the document conveying path, a first surface of the conveyed document such that a read area is larger than the conveyed document;
- a second reader that reads, in a second reading position in the document conveying path, a second surface that is opposite to the first surface such that another read area is larger than the conveyed document;
- a region detector capable of executing a process of detecting a first document region that is a region of a document in a first document image data obtained by the reading on the first surface and a process of detecting a second document region that is a region of the document in a second document image data obtained by the reading on the second surface; and
- a cropping processor that crops a document portion on the first surface from the first document image data as first cropped image data, and crops a document portion on the second surface from the second document image data as second cropped image data, based on one of the first and second document regions that is successfully detected, wherein, when the region detector successfully detects the first document region, the cropping processor does not perform the process of detecting the second document region.

10. A method for controlling a document reading device, comprising:
- conveying a document along a document conveying path;
- reading, in a first reading position in the document conveying path, a first surface of the conveyed document such that a read area is larger than the conveyed document;
- reading, in a second reading position in the document conveying path, a second surface that is opposite to the first surface such that another read area is larger than the conveyed document;
- detecting a first document region that is a region of a document in a first document image data obtained by the reading on the first surface;
- detecting a second document region that is a region of the document in a second document image data obtained by the reading on the second surface; and
- cropping a document portion on the first surface from the first document image data as first cropped image data, and cropping a document portion on the second surface from the second document image data as second cropped image data, based on one of the first and second document regions that is successfully detected, wherein, when the document reading device fails to detect the first document region and successfully detects the second document region, the document reading device recognizes a first corresponding region that corresponds to the second document region in the first document image data and crops the first corresponding region from the first document image data as the first cropped image data.

\* \* \* \* \*